United States Patent [19]

Little et al.

[11] 4,454,564

[45] Jun. 12, 1984

[54] FABRICATED CARRIAGE ASSEMBLY FOR HIGH VOLTAGE CONTACTOR

[75] Inventors: Thomas R. Little; John D. Kleinecke; Samir F. Farag, all of Wichita Falls, Tex.

[73] Assignee: Siemens-Allis, Inc., Atlanta, Ga.

[21] Appl. No.: 373,030

[22] Filed: Apr. 28, 1982

[51] Int. Cl.³ .................................... H02B 11/00
[52] U.S. Cl. ......................... 361/336; 200/50 AA
[58] Field of Search ............... 200/50 AA; 361/335, 361/336, 337, 338, 339, 340, 341, 342, 343, 344, 345, 429; 339/75 M

[56] References Cited

U.S. PATENT DOCUMENTS

| | | | |
|---|---|---|---|
| 2,424,345 | 7/1947 | West | 361/429 |
| 2,664,485 | 12/1953 | Caswell | 200/50 AA |
| 2,888,615 | 5/1959 | Tusing | 361/337 |
| 3,202,790 | 8/1965 | Burton | 200/144 R |
| 3,725,746 | 4/1973 | Carroll | 361/334 |

Primary Examiner—J. V. Truhe
Assistant Examiner—Greg Thompson
Attorney, Agent, or Firm—John L. James

[57] ABSTRACT

An improved drawout carriage assembly for the contactor of a high voltage controller. The controller carriage is fabricated from a pair of sheet metal sides, interconnected at their lower edge by formed sheet metal cross members. The upper portions of the sides are comprised of planar sheets of insulating material. A series of insulative cross members are bolted between the opposed faces of the carriage side pieces and locate elements of the contactor mechanism.

8 Claims, 2 Drawing Figures

FABRICATED CARRIAGE ASSEMBLY FOR HIGH VOLTAGE CONTACTOR

BACKGROUND OF THE INVENTION

The present invention relates to high voltage motor controllers and the like, and more particularly to an improved drawout carriage assembly for bearing a contactor.

Starting, stopping and current flow monitoring of large electric motors is conventionally carried out by apparatus termed motor control centers, or motor controllers. Such apparatus commonly takes the form of a system of relays, transformers, and contactors enclosed within one or more sheet metal cabinets. For smaller motor ratings, current interruption can be accomplished by compact contactors which can be handled manually for servicing and replacement. However, for larger high-voltage motors much larger, heavier equipment is needed. Contactors for making and breaking high voltage, high-current circuits become unwieldy, and moreover require large arc chutes and greater insulation than do lower-voltage apparatus. In addition, owing to the hazards inherent in high voltage equipment the contactor apparatus which operates at such voltages is normally enclosed in a cubicle which is physically separated from other cubicle housing lower-voltage control mechanisms.

In order to maintain and repair the high-voltage contactor it is typically mounted in a carriage assembly which may be withdrawn from its cubicle for repair or maintenance, and later installed, or "racked," back into the cubicle for operation.

When the carriage is racked into a cubicle, in order to make electrical contact with the large, heavy current-carrying members a considerable amount of force must be applied to the carriage. At the same time, very little distortion or flexure can be tolerated. For this reason and because of the considerable weight of the large, heavy contactor assemblies, transformers and associated elements which are borne by the carriage, contactor carriages have traditionally been of large, massive design. Popular constructions of such carriages have commonly included one-piece castings. While such castings are rigid and strong, they require considerable machining for the mounting of different elements on them and moreover they are expensive and heavy. Recently, efforts have been made to fabricate carriages from individual structural elements. Such approaches ordinarily include clamping the various structural elements together in a jig or fixture, and welding or otherwise assembling basic structural elements together in order to form a rigid, metal carriage assembly which may carry contactors, insulating barriers and other necessary elements. It will therefore be appreciated that it would be highly desirable to provide a contactor carriage assembly which is rigid and strong, while being lower in weight and formed from lighter fabricated components than those heretofore known.

It is therefore an object of the present invention to provide an improved construction for a contactor carriage assembly.

Another object is to provide a contactor carriage assembly of integrated construction which incorporates component supports into an overall, rigid structure.

Yet another abject is to provide a contactor carriage design which may be assembled together with bolts, while accurately maintaining all critical dimensions.

SUMMARY OF THE INVENTION

Briefly stated, in accordance with one aspect of the invention the foregoing objects are achieved by providing a pair of parallel, generally planar sheet metal side members having bent-over edges for rigidity and at least a pair of metal cross members attached to the confronting faces, near the bottom for supporting a contactor between the side members. A sheet insulation member is attached to each metal side member, overlapping it, and a pair of insulative cross members are bolted between the side members so that they extend partially above the upper edges thereof, clamping the insulative sheet members to the side members. A pair of insulative crossbars are secured between the insulating sheets near the upper ends thereof. In a preferred embodiment one of the insulative crossbars is disposed above one of the cross members, each carrying a series of clamps for receiving a fuse. At the opposite end of the carriage the crossbars carry a series of electrical connections, and conductors couple the upper fuse clamps to corresponding connections.

BRIEF DESCRIPTION OF THE DRAWINGS

While the specification concludes with claims particularly pointing out and distinctly claiming the subject matter which is regarded as the invention, it is believed that the invention will be better understood from the following description of a preferred embodiment taken in conjunction with the accompanying drawings in which:

DESCRIPTION OF A PREFERRED EMBODIMENT

Figure 1:
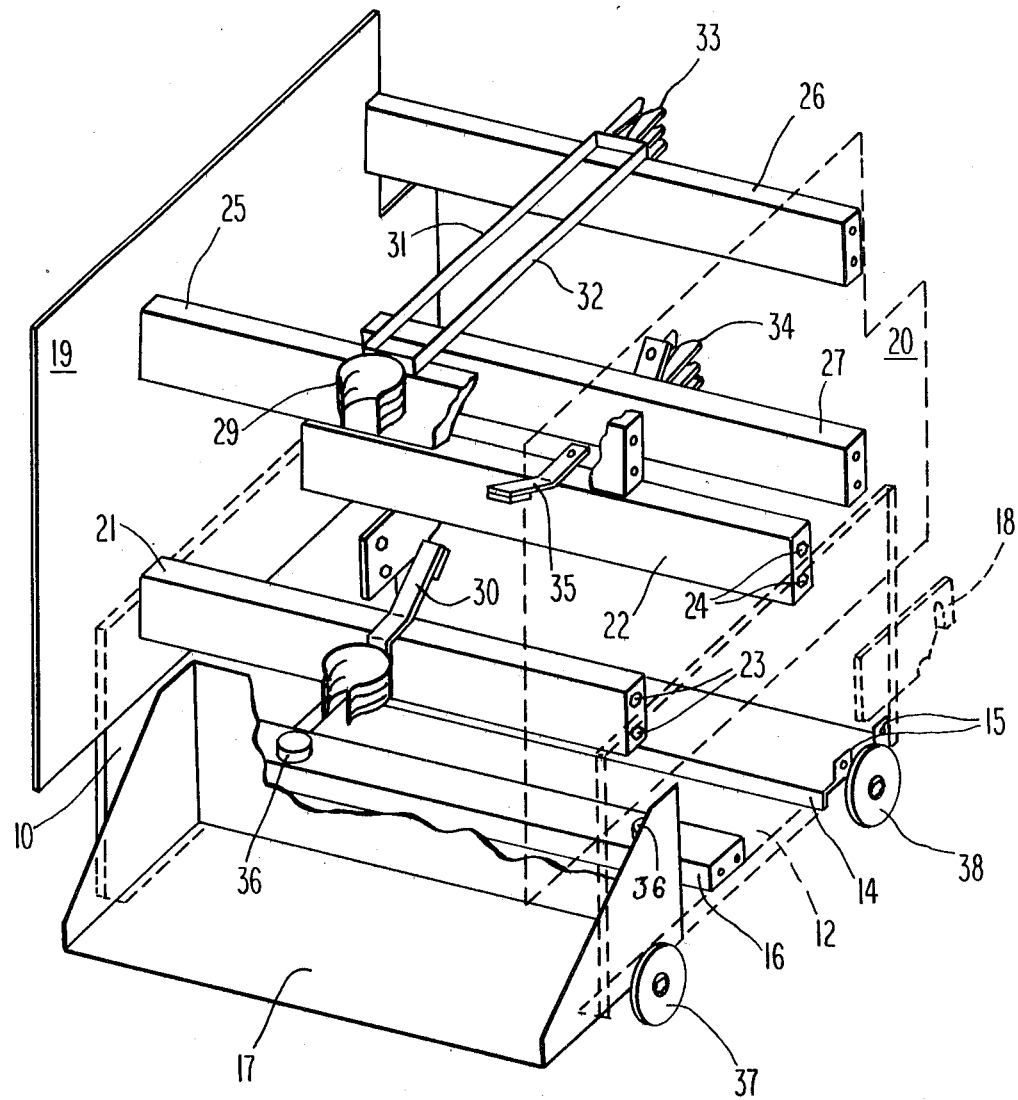
FIG. 1 is a partially cut away oblique view of a contactor carriage showing elements of the present invention.

The contactor carriage of FIG. 1 is comprised of a pair of generally planar, sheet metal side members 10 and 12, member 12 being shown by dotted lines so as to allow the construction of the carriage to be more easily seen. The front, back and top edges of each side member are bent outwardly for increased rigidity, and the bottom edge bent is inwardly for the same purpose. The bottom edges aid in locating a rear metal cross member 14 which includes a pair of upstanding tabs 15 at each end thereof so that each end of cross member 14 abuts against the planar face of the adjoining side member, spacing the members apart by the proper distance. A second metal cross member 16 is formed in much the same fashion, including bolt holes at each end thereof so that the butt ends of cross member 16 mount flush against the confronting faces of side members 10 and 12. At the front of the carriage a third metal cross member 17 is provided for carrying a transformer or other electrical gear. The member 17 comprise flat bottom and back center sections which extend between the metal side members, and two upwardly-bent side sections which are mounted flush against the inner surfaces of the side members. At the rear of each side member a racking hook 18 is mounted for engagement by the racking mechanism of the cubicle.

A pair of insulative side members 19 and 20 extend upwardly, overlapping the metal side members 10 and 12 and effectively continuing the side structures upwardly. A pair of insulative cross members 21, 22 overlap the upper edges of the metal side members and serve to clamp the insulative members between the ends of the cross members and the metal side members. Sets of bolts 23, 24 fasten the side plates and insulative side members against the cross members to provide an accurate lateral dimension to the carriage assembly and adding further rigidity to the structure.

Insulative crossbars 25, 26 and 27 are provided and tapped holes placed in their ends so that they may be tightly bolted between insulative side members 19 and 20. First crossbar 25 is positioned above cross member 21, and fuse clamps 28 and 29 affixed to them. Fuse clamp 28 is affixed to a stationary contact 30 which is fastened by bolts or similar means to cross member 21. In like manner upper fuse clamp 29 is secured to crossbar 25, and a pair of bus bars or similar, substantially rigid conductors 31, 32 extend to rear crossbar 26, where they are attached to line connector 33. The latter is depicted as comprising a set of spring-loaded fingers which tightly engage a stationary stab, or bus element, affixed to the back of the compartment which receives the contactor and are coupled to a source of line voltage. A lower load connector 34 of similar construction is provided and is attached to crossbar 27. Another, stationary contact 35 is mounted to the top of crossbar 22 for engaging the movable contacts of the contactor assembly, which is not installed in the Figure. Two stops 36 are mounted to crossbar 16 generally below contacts 30 and 35 for stopping the armature carrying the movable contacts at the bottom of its travel. A front wheel 37 and a rear wheel 38 are attached to each of the sheet metal side members 10 and 12.

As will be apparent to those skilled in the art, contactor assemblies of the type described are conventionally utilized with three-phase electric power and therefore three sets of contacts, fuses, and connector elements must be provided. While three sets of such elements are of course utilized with the carriage of FIG. 1, in the interest of clarity only the center set is shown. Upon gaining an understanding of the invention, however, it will be understood that three sets of fuse holders are mounted on members 21 and 25; three sets of "line" contactors mounted to the rear side of crossbar 26, and three sets of "load" contactors are mounted to the back surface of crossbar 27.

Figure 2:
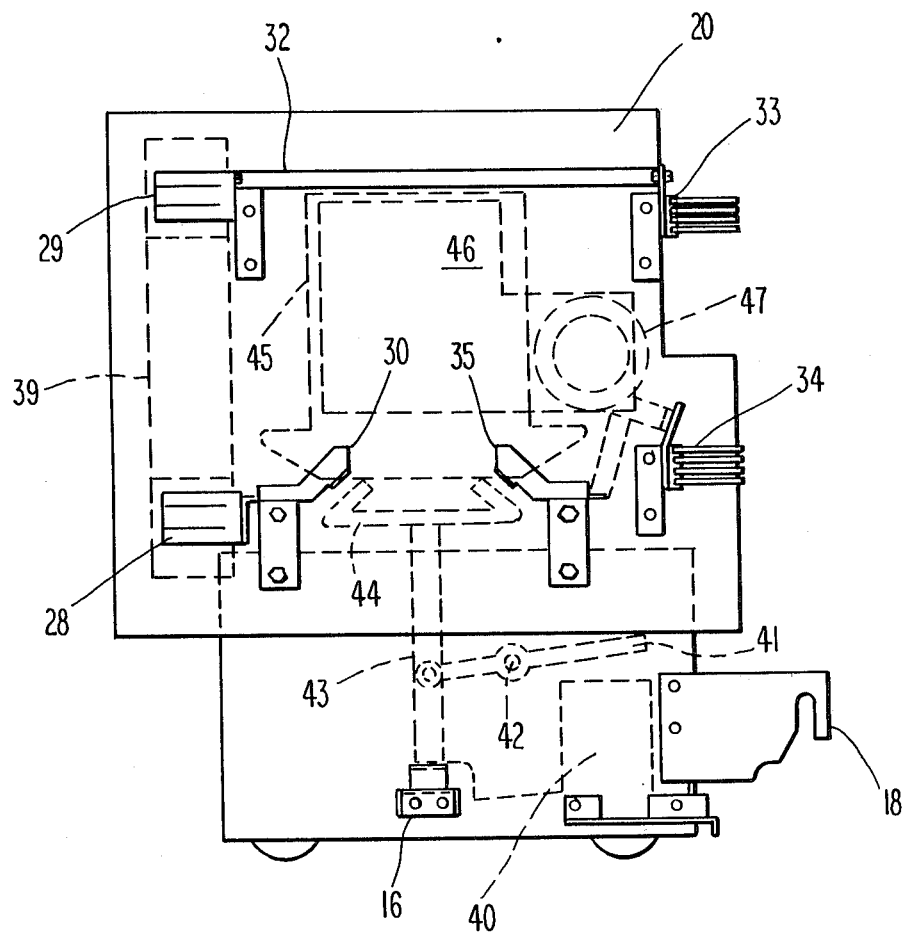
FIG. 2 is a sectional elevation of the carriage of FIG. 1.

Turning now to FIG. 2, a sectional elevation of a carriage assembly such as that shown in FIG. 1 is presented. Upper and lower fuse clamps 29, 28 receive a tubular fuse 39, while a contactor coil 40 interacts with an armature 41 which is pivoted on shaft 42 to cause pushrod 43 to move up and down in order to make or break a circuit between stationary contacts 30 and 35 by means of movable contact 44. An arc chute 45 is disposed above the stationary contacts in the conventional manner, and provided with pole shoes 46 at either side thereof. A blowout coil 47 is disposed between the pole shoes in conventional fashion, and electrically connected between fixed contact 35 and load connection 34. The specific construction of such items as the arc chute, pole shoes and blowout coil is not considered to be part of the present invention, and further description of these elements along with the operation of a contactor of the type depicted may be found in U.S. Pat. No. 3,202,790—Burton.

In operation, when coil 40 of the contactor is energized the righthand end of armature 41 is pulled downwardly, raising pushrod 43 and causing movable contacts 44 to complete a circuit between fixed contacts 30 and 35. Line connection 33 is coupled to a bus bar assembly carrying line voltage, so that when the circuit is completed current flows through conductor 32 and through fuse 39 by way of fuse connectors 28 and 29. Current then flows through fixed contact 30, movable contact 44 and fixed contact 35. The current then traverses blowout coil 47 and then flows out of the contact assembly through load connection 34.

From an inspection of FIGS. 1 and 2 it will be apparent that the contactor carriage assembly is called upon to withstand many different forces. The racking mechanism of the enclosure exerts a rearward pull upon racking hooks 18, which is transmitted through the metal side plates, insulative side members and ultimately crossbars 26, 27 in order to force the connectors 33 and 34 tightly against the mating connections in the back of the cubicle. Upon unracking the assembly, the process is reversed. Operation of the contactor itself gives rise to vertical forces, not only upon metal cross members 14 and 16, but also upon fixed contacts 30 and 35 which in turn tend to lift and rotate insulative cross members 21 and 22. Installation and removal of fuse 39 results in lateral forces on members 21 and 25. Further, when the contactor is called upon to interrupt short-circuit currents magnetic forces are exerted between all conducting members which are transmitted to the insulative cross members.

Despite the nature and diversity of the forces which the contactor carriage is called upon to sustain, it must exhibit a high degree of rigidity, since substantial movement of any of the line or load connectors while current is flowing could result in severe damage to the assembly. In addition, any misalignment of the fixed contacts 30, 35 with respect to movable contact 44 will interfere with proper operation of the contactor, and could cause arcing or other severe damage. Flexure of the lower part of the carriage assembly could lead to improper racking or unracking, or misalignment of other components. For this reason it has been conventional to provide large, heavy carriages frequently based upon a large, one-piece casting which serves as the basic structure, and upon which various insulative members and components were attached. Also, various surfaces on such large, rigid structures could be machined to provide for the accurate location of contactor elements, mountings for wheels, supports for line and load connections, and the like.

Rather than provide a heavy, monolithic lower carriage assembly on which to support all of the various elements required, the present invention contemplates a structure fabricated of a number of independent elements which may be bolted together in a fixture, the bolt holes having sufficient clearance so that minor adjustments in the relative positions of the elements may be made upon assembly, yet the elements thereafter held firmly in place by the bolted connections. For example, rather than machining surface upon which to mount wheels so that they will be a prescribed distance apart, with the present construction the width of the carriage assembly is determined by the lengths of the various cross members and crossbars. By making the ends of such cross pieces all terminate in substantially the same plane, the side plates and insulative side members can simply be bolted to the ends of the cross pieces in order to establish a proper lateral dimension. Similarly, the vertical and front-to-rear relationships of the various elements such as fixed contacts 30, 35 can be established by properly aligning insulative cross members 21, 22 during assembly. The same applies to the positioning of connectors 33 and 34, and to the fuse clamping members. Accordingly, the principal structural elements such as the metal side plates 10 and 12 and insulative side members 19 and 20 can easily be fabricated without the need for machining or tight-tolerance dimensions.

Each of adjustment during assemby is not the only advantage of the illustrated construction, however. The incorporation of the insulative and metal side members, along with the various cross pieces, into a solid monolithic structure achieves the necessary rigidity, which heretofore was accomplished only through large, heavy supporting structures. By incorporating fuse and connection-supporting members into the stress-bearing structure, along with the supports for the fixed contact elements, a synergistic combination is achieved wherein all of the depicted elements contribute to the strength of the total structure and share the stress of the loadings imposed by the various conditions which are encountered. Moreover, by incorporating the insulative side members into the load-bearing structure the present inventors have been able to minimize the height of the metal side plates and thereby increase the distance between such normally-grounded metal members and the high voltage elements which are contained within the structure. Still farther, by butting the various cross pieces flush against the vertical sides of the insulative and metal side members all of the cross pieces are provided with three degrees of freedom, as opposed to other constructions in which side members are bolted to angles or tabs which extend from the vertical side member surfaces. Fore-and-aft, vertical, and rotational freedom of the cross pieces allows the carriage assembly to be assembled to a high degree of precision, so that critical internal dimensions may be maintained, yet without the need for extensive precision machining or the use of a heavy, cumbersome base assembly. This not only provides considerable economies in the manufacture and assembly of a high voltage controller, but substantially reduces the weight of the carriage whidh makes it easier to service and maintain, and produces less stress upon the cabinet in which it is racked.

As will be evident from the foregoing description, certain aspects of the invention are not limited to the particular details of the examples illustrated, and it is therefore contemplated that other modifications or applications will occur to those skilled in the art. It is accordingly intended that the appended claims shall cover all such modifications and applications as do not depart from the true spirit and scope of the invention.

What is claimed as new and desired to be secured by Letters Patent of the United States is:

1. A drawout contactor carriage for removably locating an electrical contactor within an enclosure, comprising:
   first and second generally rectangular, sheet metal side plates having at least two opposed edges thereof bent outwardly, the confronting surfaces of said metal side plates being substantially flat and parallel to one another;
   first and second generally planar insulative sheets extending generally parallel to, and at least partly overlapping, said metal side plates;
   a plurality of metal cross members extending between said metal side plates and abutting said metal side plates in a common plane;
   first and second insulative cross members extending between said metal side plates and abutting the confronting faces thereof, each of said insulative cross members carrying at least one stationary contact of a contactor assembly; and
   first and second insulative crossbars extending generally parallel to said insulative cross members and connecting said insulative sheets, said insulative cross members abutting said insulative sheets in a common plane.

2. The invention defined in claim 1, wherein said first insulative cross member and first insulative cross bar are substantially vertically aligned; and a resilient conductive fuse clamp means fixedly attached to each said insulative cross member and insulative crossbar for supporting a plurality of fuses therebetween.

3. The invention defined in claim 1, further including at least one resilient, conductive fuse clamp member fixedly attached to said first insulative crossbar; and a corresponding electrical connector means fixedly attached to said second insulative crossbar.

4. The invention defined in claim 3, further including a pair of spaced, substantially rigid conductor means extending from said fuse clamp member to the corresponding connector means.

5. The invention defined in claim 4, further including a third insulative crossbar disposed between said second insulative crossbar and said metal cross members; and at least one electrical connector fixedly attached to said third insulative crossbar.

6. The invention defined in claim 1, wherein the ends of each of said first and second insulative cross members overlap an edge of said metal side plates; and means fixing the ends of said insulative cross members to both said side plates and to said insulative sheets.

7. The invention defined in claim 6, further including a metal cross piece connecting said side plates and comprising a generally planar center portion extending perpendicularly to and between said side plates members, and end portions extending perpendicularly to said center portion, end portions extending within and parallel to the confronting faces of said side plates.

8. The invention defined in claim 7, further including a pair of wheels spaced from one another and attached to each of said side plates.

* * * * *